US012601873B2

(12) United States Patent
Yoshida

(10) Patent No.: US 12,601,873 B2
(45) Date of Patent: Apr. 14, 2026

(54) OPTICAL CONNECTION STRUCTURE AND OPTICAL MODULE

(71) Applicant: SHINKO ELECTRIC INDUSTRIES CO., LTD., Nagano (JP)

(72) Inventor: Kazuhiro Yoshida, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 271 days.

(21) Appl. No.: 18/481,526

(22) Filed: Oct. 5, 2023

(65) Prior Publication Data

US 2024/0134118 A1 Apr. 25, 2024
US 2024/0230994 A9 Jul. 11, 2024

(30) Foreign Application Priority Data

Oct. 20, 2022 (JP) ................................. 2022-168205

(51) Int. Cl.
*G02B 6/122* (2006.01)
*G02B 6/12* (2006.01)

(52) U.S. Cl.
CPC .. *G02B 6/1228* (2013.01); *G02B 2006/12061* (2013.01)

(58) Field of Classification Search
CPC .................................................... G02B 6/1228
See application file for complete search history.

(56) References Cited

U.S. PATENT DOCUMENTS 9,513,435 B1 * 12/2016 Sun ........................ G02B 6/4237
11,815,712 B2 * 11/2023 Kalman ................... G02B 6/43

2004/0247259 A1 * 12/2004 Blom .................... G02B 6/4292
257/E31.117
2014/0193114 A1 * 7/2014 Ooba ....................... G02B 6/42
385/14
2017/0068049 A1 3/2017 Dangel et al.
2018/0313718 A1 * 11/2018 Traverso .............. G02B 6/1228
(Continued)

FOREIGN PATENT DOCUMENTS

JP 2018-200333 12/2018
WO 2022/091914 5/2022

OTHER PUBLICATIONS

Office Action mailed on Mar. 3, 2026 with respect to the corresponding Japanese patent application No. 2022-168205.

*Primary Examiner* — Charlie Y Peng
(74) *Attorney, Agent, or Firm* — IPUSA, PLLC

(57) ABSTRACT

An optical connection structure includes a first silicon photonic chip having a first lateral surface, a second silicon photonic chip having a second lateral surface that faces the first lateral surface, and an optical waveguide disposed astride a gap between the first silicon photonic chip and the second silicon photonic chip. The first silicon photonic chip includes a first silicon substrate and a first silicon waveguide disposed over the first silicon substrate. The second silicon photonic chip includes a second silicon substrate and a second silicon waveguide disposed over the second silicon substrate. The optical waveguide includes a first cladding filling a space between the first lateral surface and the second lateral surface, a core disposed on the first cladding and covering one end of the first silicon waveguide and one end of the second silicon waveguide, and a cladding covering the core.

8 Claims, 7 Drawing Sheets

(56)                    References Cited

U.S. PATENT DOCUMENTS

2018/0314151 A1 *  11/2018  Koch ..................... B29D 11/00
2018/0341063 A1    11/2018  Yamamoto
2022/0244458 A1 *   8/2022  Koch ................... G02B 6/1221

* cited by examiner

OPTICAL CONNECTION STRUCTURE AND OPTICAL MODULE

CROSS-REFERENCE TO RELATED APPLICATIONS

The present application is based on and claims priority to Japanese Patent Application No. 2022-168205 filed on Oct. 20, 2022, the entire contents of which are incorporated herein by reference.

FIELD

The disclosures herein relate to optical connection structures and optical modules.

BACKGROUND

In data centers where various types of computer, data communication apparatus, and the like are installed, optical signals are transmitted and received using an optical connection structure that includes a silicon photonic chip and an optical waveguide.

An optical connection structure as known in the art may be configured, for example, such that a silicon photonic chip is flip-chip mounted on an interconnect substrate having an optical waveguide, and such that a silicon waveguide included in the silicon photonic chip and a core included in the optical waveguide are disposed in an opposing relationship to each other with a gap therebetween.

The above-described optical connection structure may sometimes fail to provide sufficient positional accuracy between the silicon photonic chip and the optical waveguide due to difficulty in aligning the silicon photonic chip with the optical waveguide.

There may be a need to improve positional accuracy between a silicon photonic chip and an optical waveguide in an optical connection structure including the silicon photonic chip and the optical waveguide.

PATENT DOCUMENT

[Patent Document 1] International Publication No. 2022/091914

SUMMARY

According to an aspect of the embodiment, an optical connection structure includes a first silicon photonic chip having a first lateral surface, a second silicon photonic chip having a second lateral surface and disposed such that the second lateral surface faces the first lateral surface, and an optical waveguide disposed astride a gap between the first silicon photonic chip and the second silicon photonic chip. The first silicon photonic chip includes a first silicon substrate and a first silicon waveguide disposed over an upper surface of the first silicon substrate. The second silicon photonic chip includes a second silicon substrate and a second silicon waveguide disposed over an upper surface of the second silicon substrate. The optical waveguide includes a first cladding filling a space between the first lateral surface and the second lateral surface, a core disposed on the first cladding and covering one end of the first silicon waveguide and one end of the second silicon waveguide, the core optically connecting the first silicon waveguide and the second silicon waveguide, and a second cladding covering the core.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figures 1A, 1B:
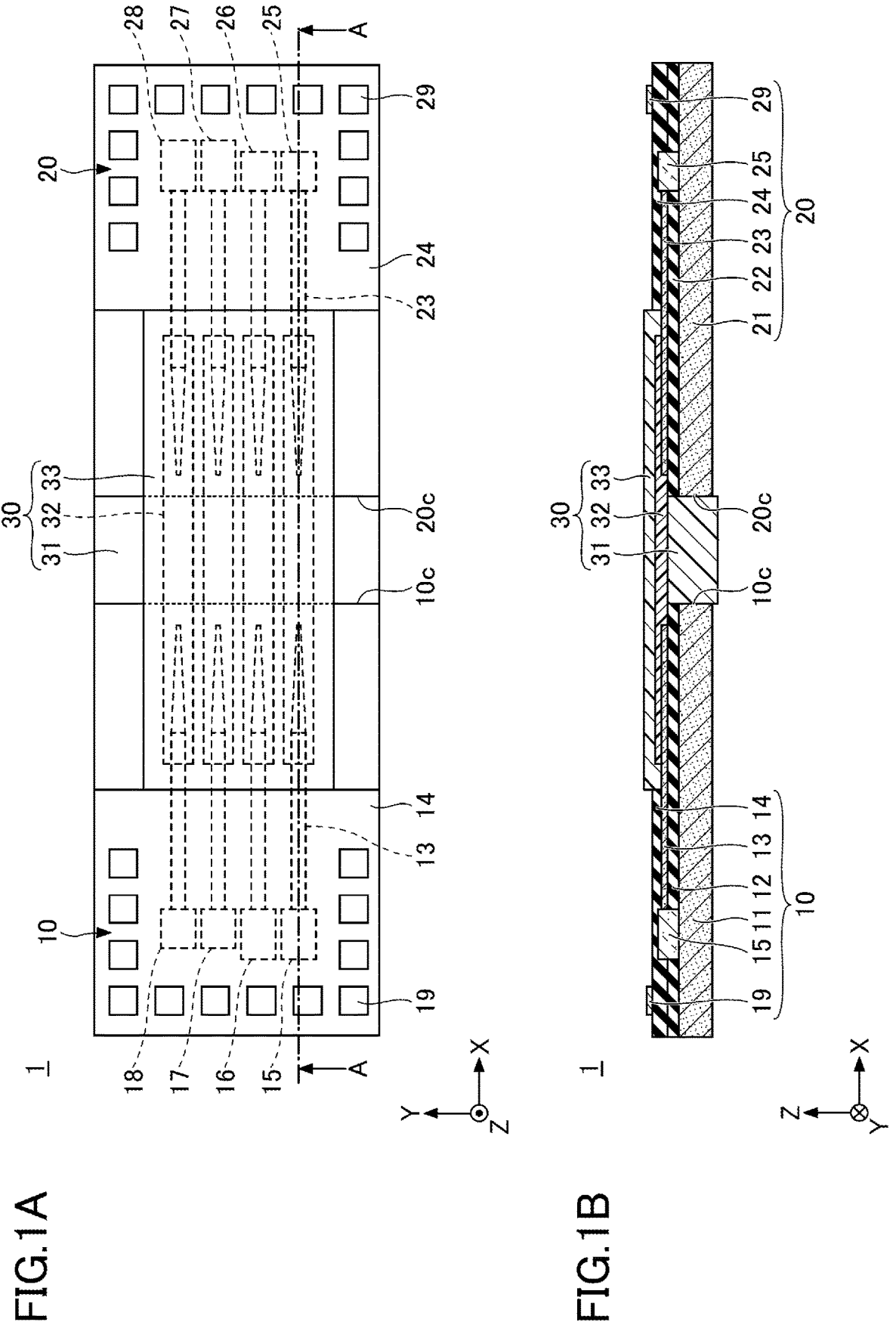
FIGS. 1A and 1B are drawings illustrating an optical connection structure according to a first embodiment.

In the following, embodiments of the present invention will be described with reference to the accompanying drawings.

In the following, embodiments for carrying out the invention will be described with reference to the drawings. In the drawings, the same components are denoted by the same reference numerals, and duplicate descriptions may be omitted.

First Embodiment

[Optical Connection Structure]

FIGS. 1A and 1B are drawings illustrating an optical connection structure according to a first embodiment. FIG. 1A is the plan view, and FIG. 1B is a cross-sectional view taken along the line A-A in FIG. 1A. In FIGS. 1A and 1B, an X direction, a Y direction, and a Z direction orthogonal to each other are defined for reference purposes. In the subsequent drawings, the same or similar directions may be defined according to need.

As illustrated in FIGS. 1A and 1B, an optical connection structure 1 according to the first embodiment includes a first silicon photonic chip 10, a second silicon photonic chip 20, and an optical waveguide 30. As an example, the plane shape of the optical connection structure 1 is a rectangle such that the long side of the rectangle is parallel to the X direction, and the short side of the rectangle is parallel to the Y direction. The Z direction is the direction in which layers constituting the optical connection structure 1 are stacked one on another. The appearance of an object as seen along the Z direction is referred to as the plan view, and the shape of the object in such a view is referred to as a plane shape.

The first silicon photonic chip 10 includes a first silicon substrate 11 and at least one first silicon waveguide 13 disposed over the upper surface of the first silicon substrate 11. The first silicon photonic chip 10 has a first lateral surface 10c. For example, the first lateral surface 10c is parallel to the Y-Z plane. The thickness of the first silicon substrate 11 is, for example, about 100 μm to 800 μm.

The first silicon waveguide 13 is disposed between a first protective film 12 provided on the first silicon substrate 11 and a second protective film 14 provided over the first protective film 12. The first protective film 12 and the second protective film 14 may be formed of, for example, SiO₂, SiOx, or the like. The thicknesses of the first protective film 12 and the second protective film 14 are, for example, about 2 μm to 6 μm.

The number of first silicon waveguides 13 may be determined according to need. In the example illustrated in FIG. 1, four elongated first silicon waveguides 13 having a longitudinal direction in the X direction in the plan view are arranged side by side at predetermined intervals in the Y direction on the first protective film 12. The pitch of the first silicon waveguides 13 arranged alongside may be, for example, about 20 μm to 300 μm. Part of each first silicon waveguide 13 is covered with the second protective film 14. The first silicon waveguides 13 each function as a core, and the first protective film 12 and the second protective film 14 function as claddings.

One end of each first silicon waveguide 13 extends beyond the second protective film 14. In the plan view, one end of each first silicon waveguide 13 has a tapered shape. That is, in the plan view, the width of the one end of each first silicon waveguide 13 narrows toward a first cladding 31 (described later). Such a shape improves the optical coupling efficiency between the first silicon waveguide 13 and a core 32 (described later). The width of the first silicon waveguide 13 other than the tapered portion is, for example, about 200 nm to 500 nm. The width of the tip of the tapered portion is, for example, about half the width of the portion having the constant width. The thickness of each first silicon waveguide 13 is constant. The thickness of each first silicon waveguide 13 is, for example, about 20 nm to 300 nm.

The first silicon photonic chip 10 further includes light emitting devices 15 and 16 emitting light that is coupled into the other ends of some first silicon waveguides 13, and light receiving devices 17 and 18 that receive light emitted from the other ends of the other first silicon waveguides 13. The light emitting devices 15 and 16 and the light receiving devices 17 and 18 are mounted on, for example, the first silicon substrate 11. The first silicon substrate 11 may be provided with cavities for mounting the light emitting devices 15 and 16 and the light receiving devices 17 and 18. The light emitting devices 15 and 16 are, for example, laser diodes. The light receiving devices 17 and 18 are, for example, photodiodes.

The first silicon photonic chip 10 further includes electrode pads 19 for external connection. For example, a plurality of electrode pads 19 are provided on the second protective film 14, and are electrically connected to the light emitting devices 15 and 16 and the light receiving devices 17 and 18. The electrode pads 19 may be formed of, for example, copper or aluminum.

The second silicon photonic chip 20 includes a second silicon substrate 21 and at least one second silicon waveguide 23 disposed over the upper surface of the second silicon substrate 21. The second silicon photonic chip 20 has a second lateral surface 20c. The second lateral surface 20c is, for example, parallel to the Y-Z plane. The second silicon photonic chip 20 is disposed such that the second lateral surface 20c faces the first lateral surface 10c. The thickness of the second silicon substrate 21 is, for example, substantially the same as the thickness of the first silicon substrate 11.

The second silicon waveguide 23 is disposed between a third protective film 22 provided on the second silicon substrate 21 and a fourth protective film 24 provided over the third protective film 22. The third protective film 22 and the fourth protective film 24 may be formed of, for example, SiO₂, SiOx, or the like. The thicknesses of the third protective film 22 and the fourth protective film 24 are, for example, substantially the same as the thicknesses of the first protective film 12 and the second protective film 14.

The number of second silicon waveguides 23 may be determined according to need. In the example illustrated in FIG. 1, four elongated second silicon waveguides 23 having the longitudinal direction in the X direction in the plan view are arranged side by side at predetermined intervals in the Y direction on the third protective film 22. The pitch of the second silicon waveguides 23 arranged alongside is, for example, substantially the same as the pitch of the first silicon waveguides 13 arranged alongside. Part of each second silicon waveguide 23 is covered with the fourth protective film 24. The second silicon waveguides 23 each function as a core, and the third protective film 22 and the fourth protective film 24 function as claddings.

One end of each second silicon waveguide 23 extends beyond the fourth protective film 24. In the plan view, the one end of each second silicon waveguide 23 has a tapered shape. That is, in the plan view, the width of the one end of each second silicon waveguide 23 narrows toward the first cladding 31 (described later). Such a shape improves the optical coupling efficiency between the second silicon waveguide 23 and the core 32 (described later) The widths of the second silicon waveguides 23 are substantially the same as the widths of the first silicon waveguides 13. The width of the tip of the tapered portion is substantially the same as that of the first silicon waveguide 13. The thickness of each second silicon waveguide 23 is constant. The thicknesses of the second silicon waveguides 23 are, for example, substantially the same as the thicknesses of the first silicon waveguides 13.

The second silicon photonic chip 20 further includes light receiving devices 25 and 26 that receive light emitted from the other ends of some second silicon waveguides 23, and light emitting devices 27 and 28 emitting light that is coupled into the other ends of the other second silicon waveguide 23. The light receiving devices 25 and 26 and the light emitting devices 27 and 28 are mounted on, for example, the second silicon substrate 21. The second silicon substrate 21 may be provided with cavities for mounting the light receiving devices 25 and 26 and the light emitting devices 27 and 28. The light receiving devices 25 and 26 are, for example, photodiodes. The light emitting devices 27 and 28 are, for example, laser diodes.

The second silicon photonic chip 20 further includes electrode pads 29 for external connection. For example, a plurality of electrode pads 29 are provided on the fourth protective film 24, and are electrically connected to the light receiving devices 25 and 26 and the light emitting devices 27 and 28. The electrode pads 29 may be formed of, for example, copper or aluminum.

The optical waveguide 30 is disposed astride a gap between the first silicon photonic chip 10 and the second silicon photonic chip 20. The optical waveguide 30 includes the first cladding 31, cores 32, and a second cladding 33. The first cladding 31 fills a space between the first lateral surface 10c of the first silicon photonic chip 10 and the second lateral surface 20c of the second silicon photonic chip 20. The distance between the first lateral surface 10c and the second lateral surface 20c is, for example, about 0.3 mm to 20 mm.

The upper surface of the first protective film 12 on which the first silicon waveguides 13 are disposed, the upper surface of the third protective film 22 on which the second silicon waveguides 23 are disposed, and the upper surface of the first cladding 31 on which the cores 32 are disposed are, for example, flush with each other. The lower surface of the first cladding 31 may protrude beyond the lower surfaces of the first silicon substrate 11 and the second silicon substrate 21. Alternatively, the lower surface of the first cladding 31 may be flush with the lower surfaces of the first silicon substrate 11 and the second silicon substrate 21.

The first cladding 31 is formed of, for example, a photosensitive material. Specifically, the first cladding 31 may be formed of, for example, a polymer such as a polyimide resin, an acrylic resin, an epoxy resin, a polyolefin resin, or a polynorbornene resin. The thickness of the first cladding 31 is preferably, for example, 10 μm or more.

The cores 32 are disposed on the first cladding 31 and extend from above the first cladding 31 to above the first protective film 12 and the third protective film 22. In the example illustrated in FIG. 1, four elongated cores 32 having the longitudinal direction in the X direction in the plan view are arranged side by side at predetermined intervals in the Y direction on the first cladding 31. Each core 32 covers one end of a corresponding first silicon waveguide 13 and one end of a corresponding second silicon waveguide 23, and optically connects the first silicon waveguide 13 and the second silicon waveguide 23. Each core 32 covers at least a tapered portion of a corresponding first silicon waveguide 13 and a tapered portion of a corresponding second silicon waveguide 23. The pitch of the cores 32 arranged alongside may be, for example, about 100 μm to 300 μm. The cores 32 may be formed of substantially the same material as that of the first cladding 31. The thicknesses of the cores 32 may be, for example, about 3 μm to 10 μm. The transverse cross-sectional shape of the cores 32 may be, for example, a square.

The second cladding 33 is formed on the first cladding 31, and extends from above the first cladding 31 to above the first protective film 12 and the third protective film 22. The second cladding 33 covers at least the upper surface, both side surfaces in the longitudinal direction, and both side surfaces in the transverse direction of each core 32. The second cladding 33 preferably covers the first silicon waveguides 13 extending beyond the second protective film 14 and the second silicon waveguides 23 extending beyond the fourth protective film 24. The second cladding 33 may cover edge portions of the second protective film 14 and the fourth protective film 24. This configuration enables the reduction of optical loss that may occur due to the leakage of light from the first silicon waveguides 13 and the second silicon waveguides 23. The second cladding 33 may be formed of substantially the same material as that of the first cladding 31. The thickness of the second cladding 33 may be, for example, about 10 μm to 30 μm.

As described above, the first cladding 31, the cores 32, and the second cladding 33 may be formed of the same material, but the refractive index of the cores 32 is higher than the refractive indices of the first cladding 31 and the second cladding 33. The refractive index of the cores 32 may be made higher than the refractive indices of the first cladding 31 and the second cladding 33 by adding to the cores 32 an additive such as Ge for controlling a refractive index. The refractive indices of the first cladding 31 and the second cladding 33 may be, for example, 1.5, and the refractive index of the cores 32 may be, for example, 1.6.

In FIG. 1, light emitted from the light emitting device 15, for example, enters a corresponding first silicon waveguide 13, propagates through the first silicon waveguide 13, and enters a corresponding core 32 of the optical waveguide 30. The light propagating through the core 32 and emitted from the core 32 enters a corresponding second silicon waveguide 23, propagates through the second silicon waveguide 23, reaches the light receiving device 25, and is converted into an electric signal by the light receiving device 25.

Light emitted from the light emitting device 16 enters a corresponding first silicon waveguide 13, propagates through the first silicon waveguide 13, and enters a corresponding core 32 of the optical waveguide 30. The light propagating through the core 32 and emitted from the core 32 enters a corresponding second silicon waveguide 23, propagates through the second silicon waveguide 23, reaches the light receiving device 26, and is converted into an electric signal by the light receiving device 26.

The light emitted from the light emitting device 27 enters a corresponding second silicon waveguide 23, propagates through the second silicon waveguide 23, and enters a corresponding core 32 of the optical waveguide 30. The light propagating through the core 32 and emitted from the core 32 enters a corresponding first silicon waveguide 13, propagates through the first silicon waveguide 13, reaches the light receiving device 17, and is converted into an electric signal by the light receiving device 17.

The light emitted from the light emitting device 28 enters a corresponding second silicon waveguide 23, propagates through the second silicon waveguide 23, and enters a corresponding core 32 of the optical waveguide 30. The light propagating through the core 32 and emitted from the core 32 enters a corresponding first silicon waveguide 13, propagates through the first silicon waveguide 13, reaches the light receiving device 18, and is converted into an electric signal by the light receiving device 18.

[Method of Making Optical Connection Structure]

In the following, a method of making the optical connection structure 1 will be described. FIGS. 2A and 2B to FIGS. 5A and 5B are drawings illustrating the method of making the optical connection structure according to the first embodiment. FIGS. 2A, 3A, 4A, and 5A are plan views corresponding to FIG. 1A, and FIGS. 2B, 3B, 4B, and 5B are cross-sectional views corresponding to FIG. 1B.

Figure 2A:
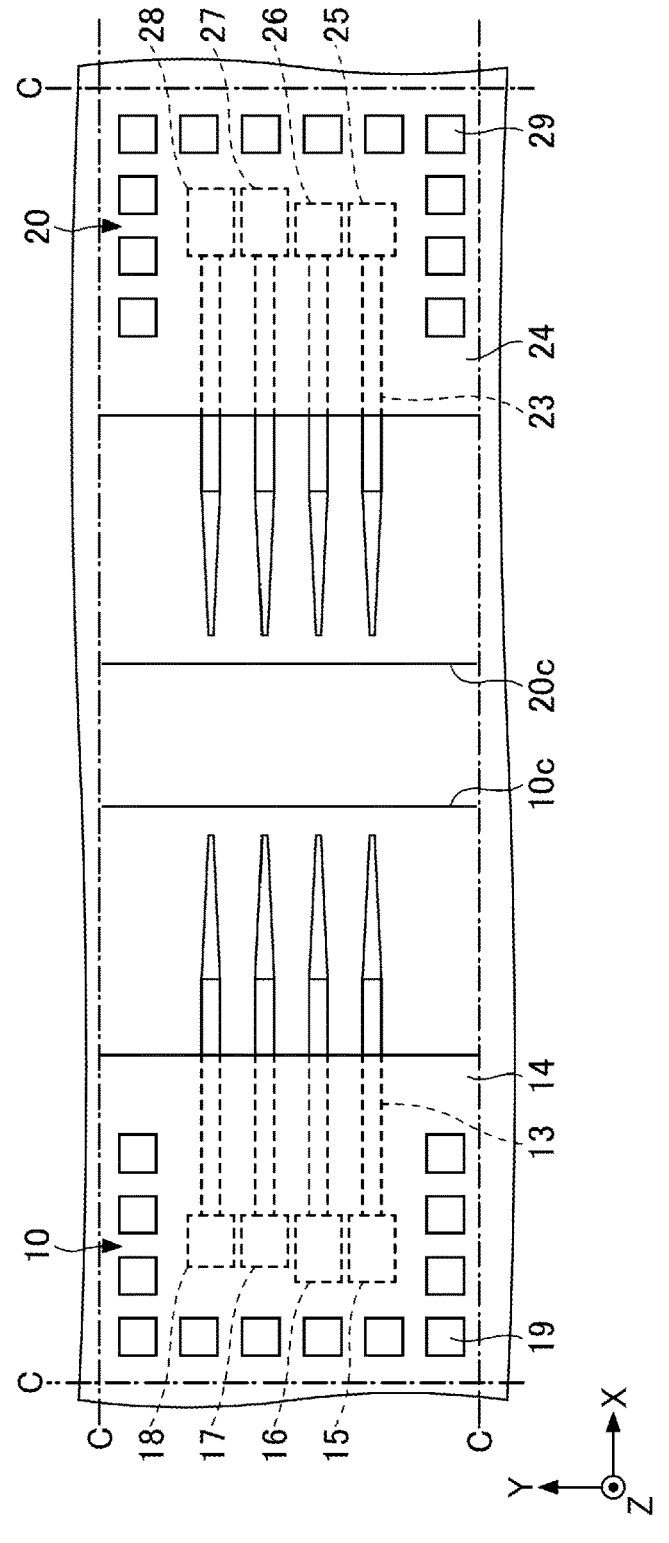
FIGS. 2A and 2B are drawings (part 1) illustrating a method of making the optical connection structure according to the first embodiment.
Figure 2B:
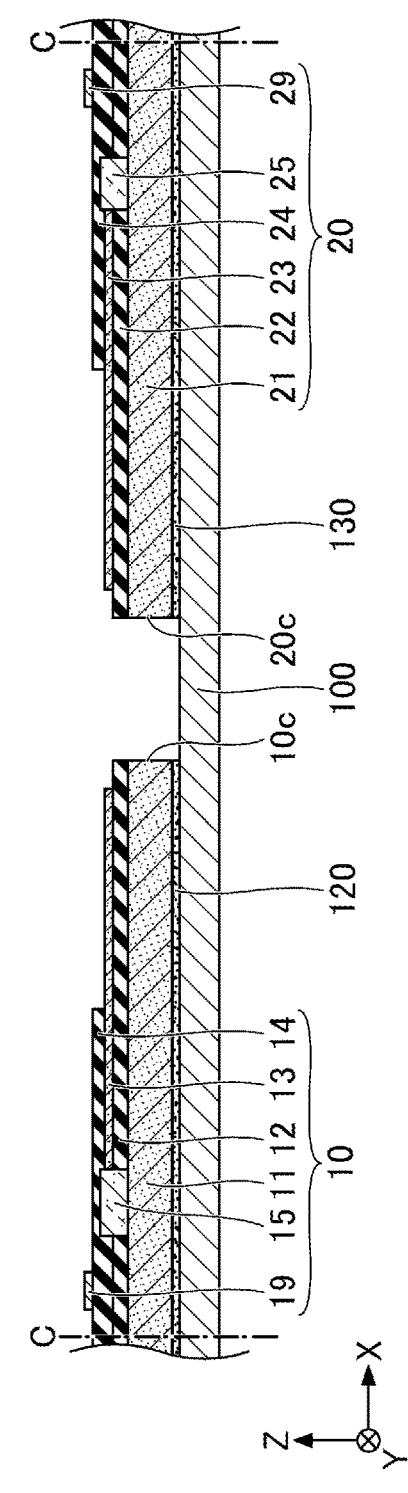

In the process steps illustrated in FIGS. 2A and 2B, the first silicon photonic chip 10, the second silicon photonic chip 20, and a support substrate 100 having at least one flat surface are provided. The first silicon photonic chip 10 and the second silicon photonic chip 20 are bonded to the upper surface of the support substrate 100 in a face-up manner via a first adhesive layer 120 and a second adhesive layer 130, respectively, such that the first lateral surface 10c and the second lateral surface 20c face each other. Examples of the first adhesive layer 120 and the second adhesive layer 130 include a die attach film, a photosensitive patterning adhesive, and a liquid adhesive. The support substrate 100 is mechanically connected to, but is not electrically connected to, the first silicon photonic chip 10 and the second silicon photonic chip 20.

As the support substrate 100, a substrate made of silicon, glass, ceramic, metal, or the like may be used. The thickness of the support substrate 100 may be, for example, about 500

μm. The upper surface of the support substrate 100 preferably has alignment marks formed thereon that are used for alignment when bonding the first silicon photonic chip 10 and the second silicon photonic chip 20.

Pressure and heat may be applied during the process of bonding the first silicon photonic chip 10 and the second silicon photonic chip 20 to the upper surface of the support substrate 100. The pressure and heat required for this purpose can be sufficiently lower than the pressure and heat generally required for flip-chip mounting of devices.

A plurality of regions for forming the optical connection structure 1 are defined on the upper surface of the support substrate 100. The plurality of regions may be two dimensionally arranged in a matrix, for example. A region surrounded by dash dot lines C shown in FIG. 2A is one of the regions each for forming the optical connection structure 1. In this process step, the first silicon photonic chip 10 and the second silicon photonic chip 20 are bonded to each of the regions defined on the upper surface of the support substrate 100.

Figure 3A:
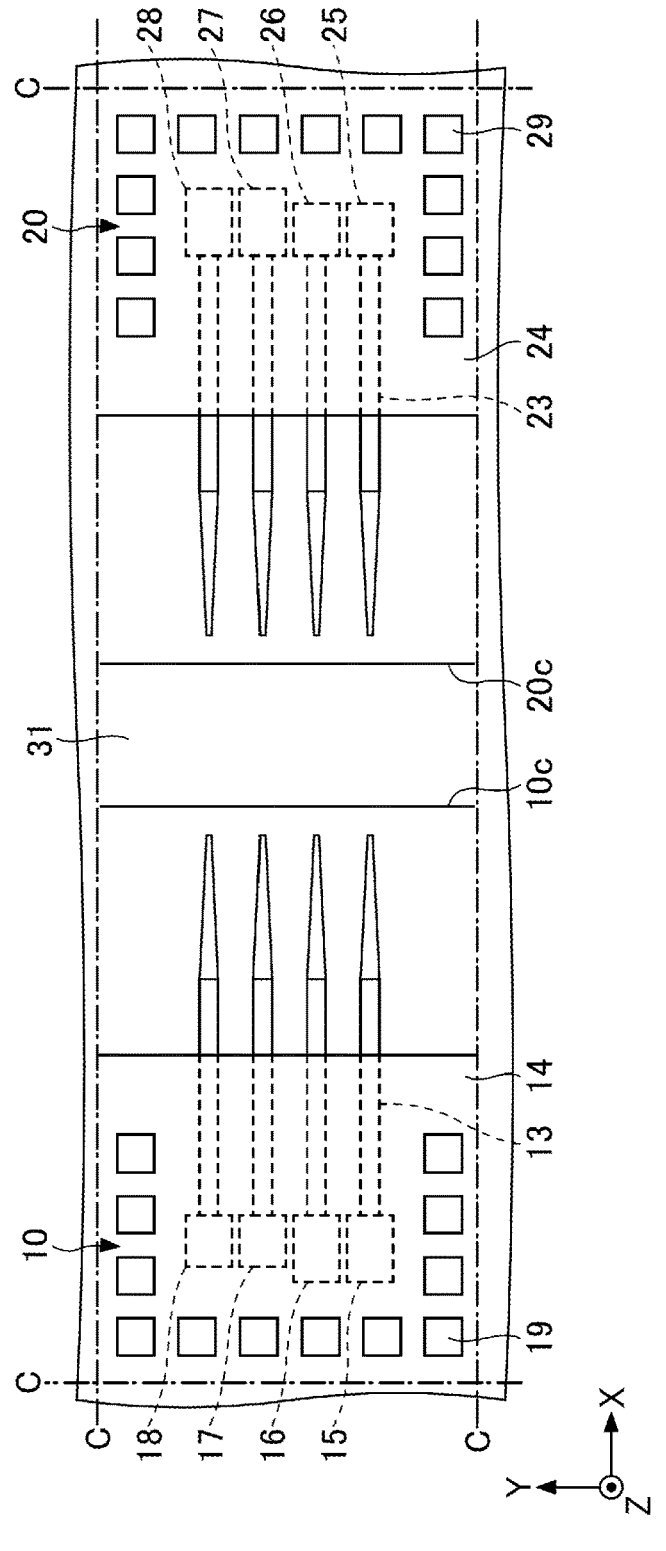
FIGS. 3A and 3B are drawings (part 2) illustrating the method of making the optical connection structure according to the first embodiment.
Figure 3B:
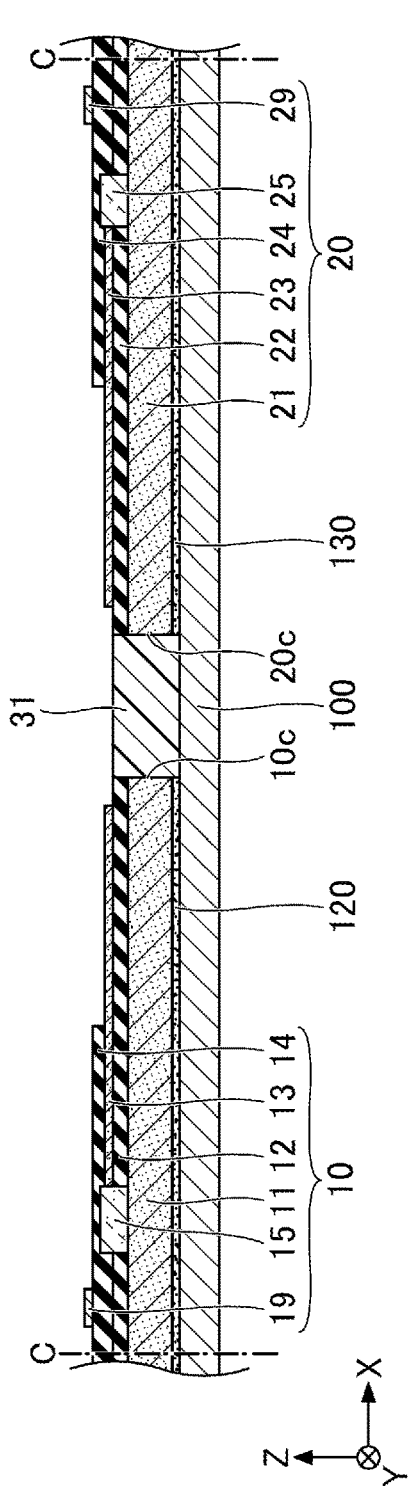

In the process step illustrated in FIGS. 3A and 3B, the first cladding 31 is formed on the upper surface of the support substrate 100 such as to fill the gap between the first lateral surface 10c of the first silicon photonic chip 10 and the second lateral surface 20c of the second silicon photonic chip 20. The first cladding 31 may be formed by laminating a resin material film, for example. Alternatively, the first cladding 31 may be formed by applying a liquid or paste resin material to the upper surface of the support substrate 100 and then curing the resin material by ultraviolet irradiation, heating, or the like. The material and the like of the first cladding 31 are as previously described. In this process step, the upper surface of the first cladding 31 is preferably made flush with the upper surface of the first protective film 12 and the upper surface of the third protective film 22 by, for example, pressing the upper surface of the first cladding 31. This arrangement makes it easy to form the cores 32.

Figures 4A, 4B:
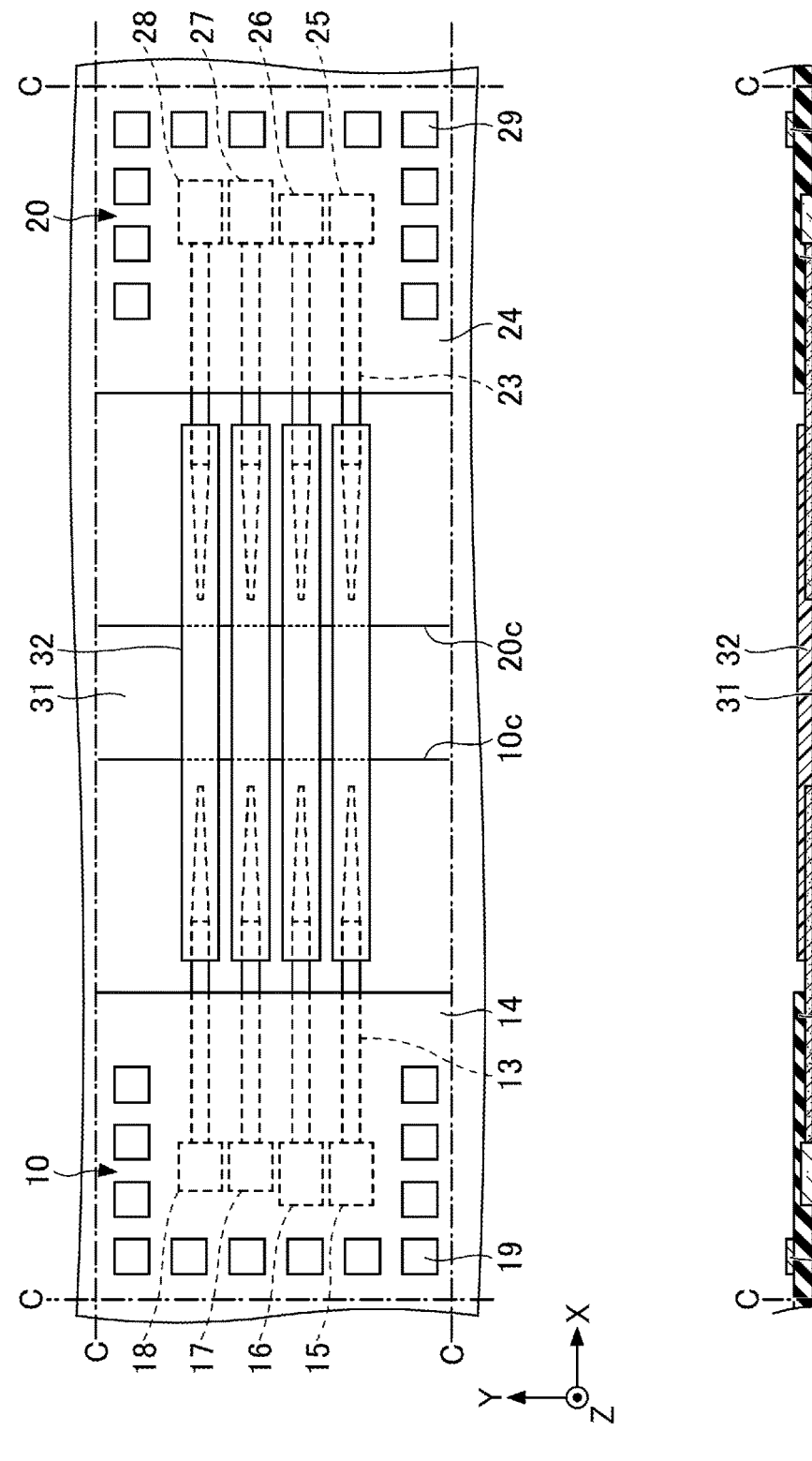
FIGS. 4A and 4B are drawings (part 3) illustrating the method of making the optical connection structure according to the first embodiment.

In the process step illustrated in FIGS. 4A and 4B, a plurality of cores 32 are formed on the upper surface of the first cladding 31, the upper surface of the first protective film 12, and the upper surface of the third protective film 22. Each core 32 is formed such as to cover one end of a corresponding first silicon waveguide 13 and one end of a corresponding second silicon waveguide 23 and to optically connect the first silicon waveguide 13 and the second silicon waveguide 23. Each core 32 is formed such as to cover at least the tapered portion of a corresponding first silicon waveguide 13. Each core 32 may be formed by laminating a resin material film, for example. Alternatively, each core 32 may be formed by applying a liquid or paste resin material and then curing the resin material by ultraviolet irradiation, heating, or the like. The material and the like of each core 32 are as previously described.

Figures 5A, 5B:
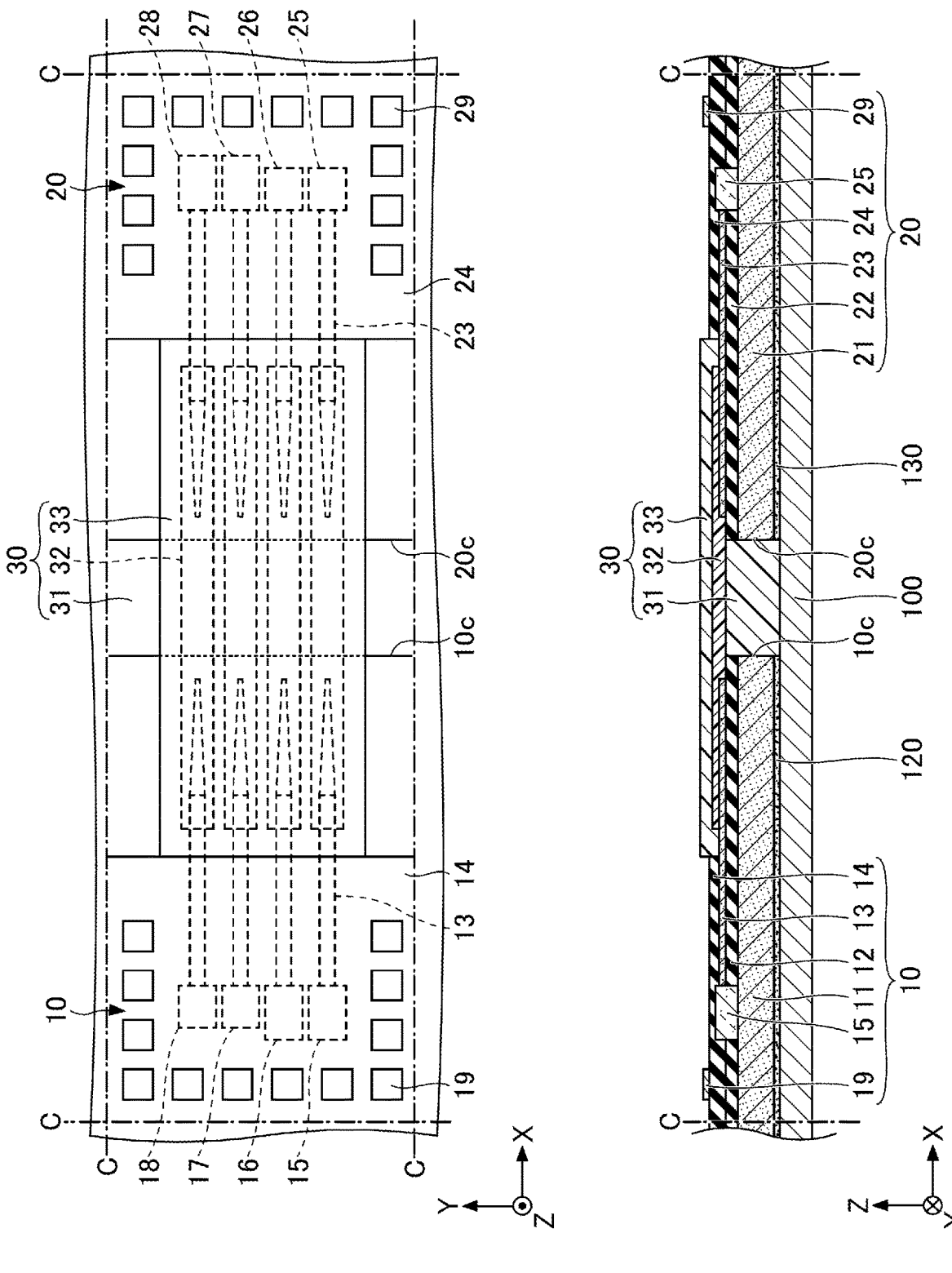
FIGS. 5A and 5B are drawings (part 4) illustrating the method of making the optical connection structure according to the first embodiment.

In the process step illustrated in FIGS. 5A and 5B, the second cladding 33 is formed on the upper surface of the first cladding 31, the upper surface of the first protective film 12, and the upper surface of the third protective film 22 such as to cover each core 32. The second cladding 33 is formed such as to cover at least the upper surface, both side surfaces in the longitudinal direction, and both side surfaces in the transverse direction of each core 32. The second cladding 33 preferably covers the first silicon waveguides 13 exposed beyond the second protective film 14 and the second silicon waveguides 23 exposed beyond the fourth protective film 24. The second cladding 33 may cover edge portions of the second protective film 14 and the fourth protective film 24. The second cladding 33 may be formed by, for example, a method similar to that used for the first cladding 31. The material and the like of the second cladding 33 are as previously described.

After the step illustrated in FIGS. 5A and 5B, the support substrate 100 is removed, and cuts are made along the dash dot lines C illustrated in FIGS. 5A and 5B to perform singulation, which results in a plurality of optical connection structures 1 being completed in final form. These cuts may be made by a dicer or the like. The first adhesive layer 120 and the second adhesive layer 130 may be removed at the same time as the support substrate 100, or may be partially or entirely left on the optical connection structure 1.

As described heretofore, the first silicon photonic chip 10, the second silicon photonic chip 20, and the optical waveguide 30 are integrated on the support substrate 100 for the optical connection structure 1. Since the bonding of the first silicon photonic chip 10 and the second silicon photonic chip 20 to the support substrate 100 does not involve electrical connection, the amount of applied pressure and heat can be reduced compared to when flip-chip mounting is used. This arrangement enables the first silicon photonic chip 10, the second silicon photonic chip 20, and the optical waveguide 30 to be aligned with high precision, and achieves submicron positional accuracy (for example, about ±0.5 μm).

Further, the optical connection structure 1 is configured such that the first silicon waveguides 13 of the first silicon photonic chip 10 and the second silicon waveguides 23 of the second silicon photonic chip 20 are directly connected to the optical waveguide 30 without a gap therebetween. It is thus possible to reduce optical loss between the optical waveguide 30 and each of the first silicon waveguides 13 and the second silicon waveguides 23.

[Optical Module]

Figure 6:
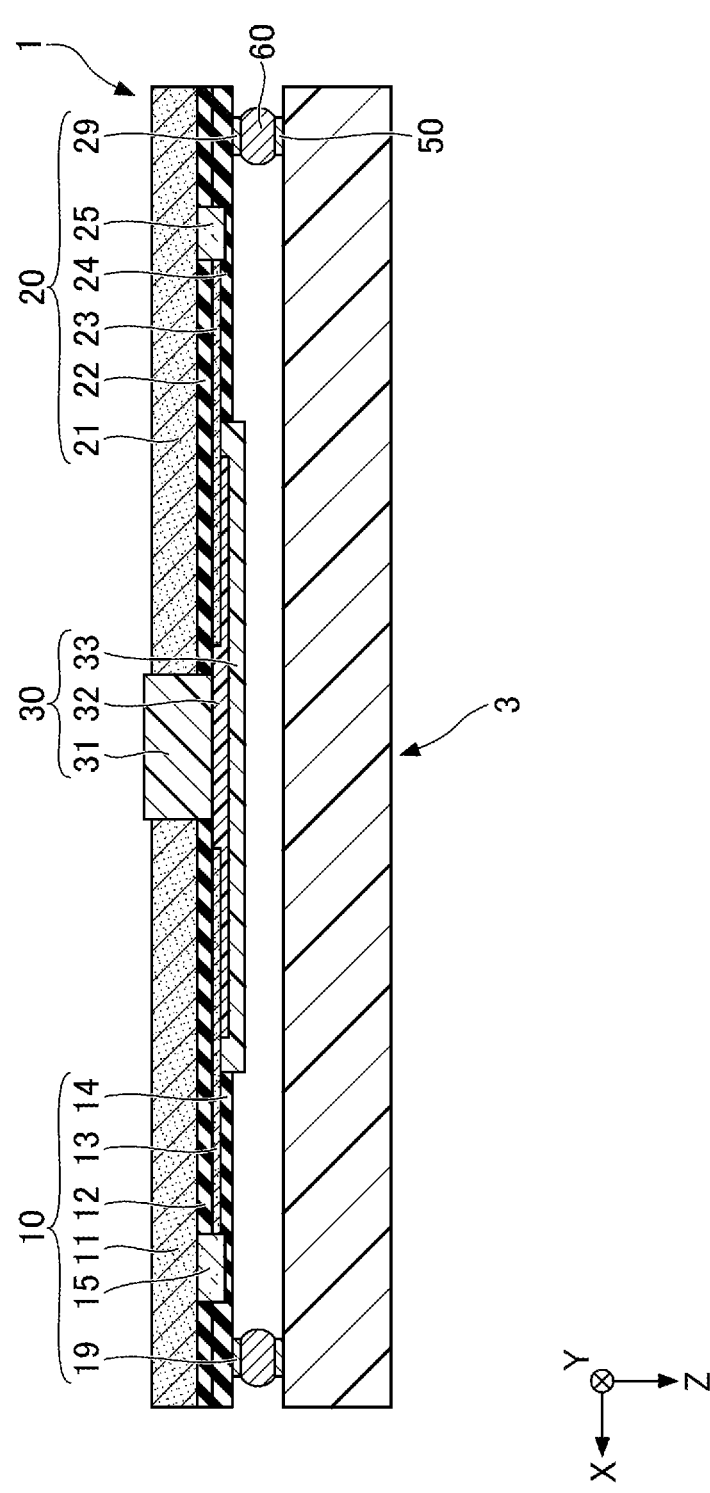
FIG. 6 is a cross-sectional view illustrating an optical module according to the first embodiment.

FIG. 6 is a cross-sectional view illustrating an optical module according to the first embodiment. As illustrated in FIG. 6, an optical module 2 includes an optical connection structure 1 and an interconnect substrate 3. The interconnect substrate 3 is, for example, a build-up substrate in which insulating layers and interconnect layers are alternately stacked. This is not a limiting example, and any interconnect substrate such as a silicon substrate or a ceramic substrate may alternatively be used. In FIG. 6, the optical connection structure 1 is illustrated upside down relative to what is illustrated in FIG. 1.

In the optical module 2, the first silicon photonic chip 10 and the second silicon photonic chip 20 of the optical connection structure 1 are flip-chip mounted on the interconnect substrate 3. Specifically, a plurality of electrode pads 50 are formed on the upper surface of the interconnect substrate 3. The electrode pads 50 of the interconnect substrate 3 are electrically connected to electrode pads 19 of the first silicon photonic chip 10 and electrode pads 29 of the second silicon photonic chip 20 via respective bonding members 60. The bonding members 60 are, for example, solder balls, copper pillar bumps, or the like.

In the optical module 2, the light emitting device 15 or the like of the first silicon photonic chip 10 emits light in accordance with an electric signal from the interconnect substrate 3. The light is converted into an electric signal by the light receiving device 25 or the like of the second silicon photonic chip 20 and transmitted to the interconnect substrate 3. The reason why the flip-chip mounting is adopted in the optical module 2 is to exchange high-speed electrical signals between the interconnect substrate 3 and each of the first silicon photonic chip 10 and the second silicon photonic chip 20.

Figures 7, 8:
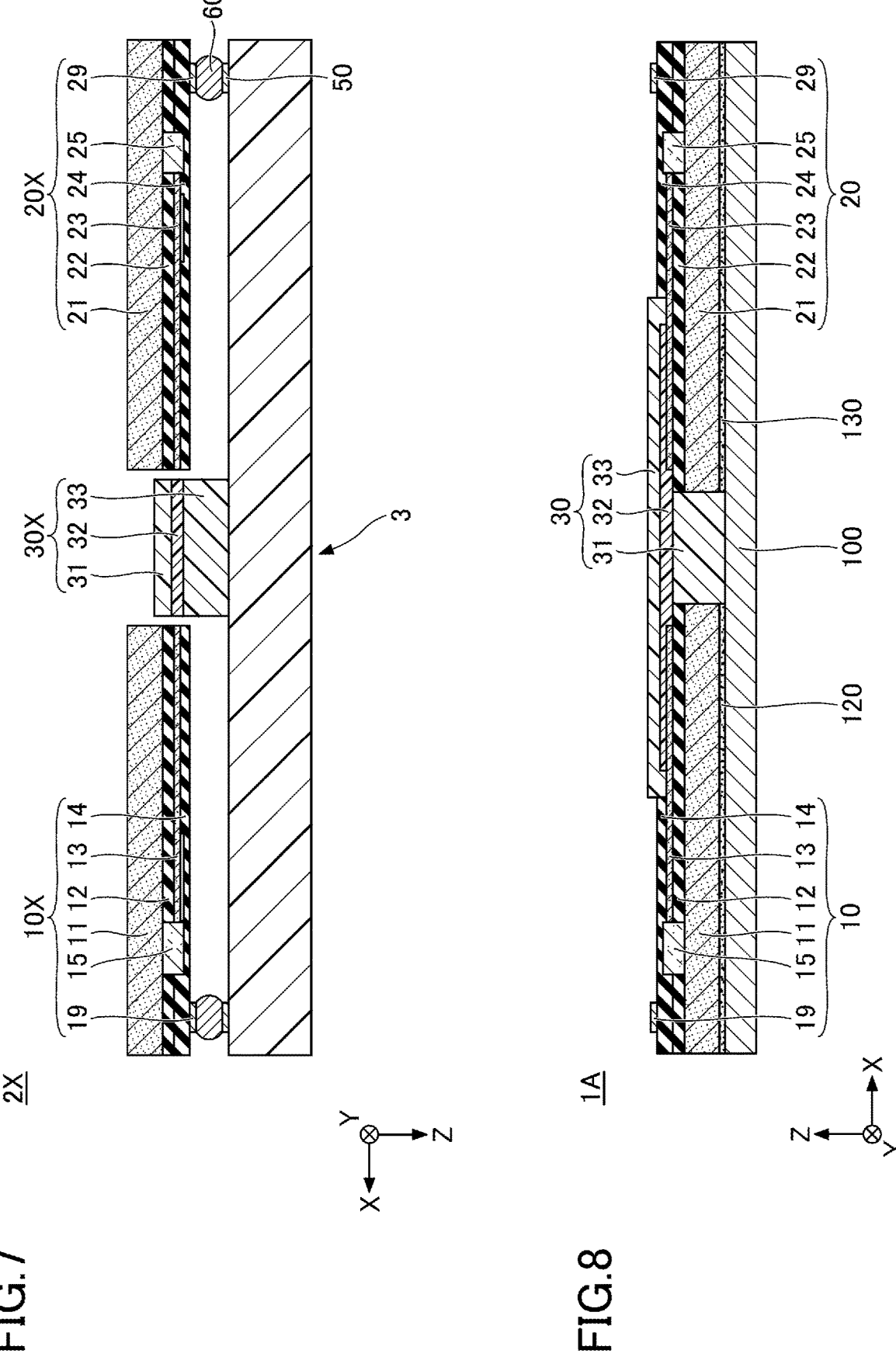
FIG. 7 is a cross-sectional view illustrating an optical module according to a comparative example.
FIG. 8 is a cross-sectional view illustrating an optical connection structure according to a first variation of the first embodiment.

FIG. 7 is a cross-sectional view illustrating an optical module according to a comparative example. As illustrated in FIG. 7, an optical module 2X according to the comparative example is configured such that a first silicon photonic chip 10X, a second silicon photonic chip 20X, and an optical waveguide 30X that are distinct from each other are flip-chip mounted on an interconnect substrate 3.

The first silicon photonic chip 10X, the second silicon photonic chip 20X, and the optical waveguide 30X are aligned with each other when mounted on the interconnect substrate 3. For example, the first silicon photonic chip 10X and the second silicon photonic chip 20X are flip-chip mounted, while being optically aligned with the optical waveguide 30X, on the interconnect substrate 3 on which the optical waveguide 30X is formed. Since the flip-chip mounting is performed while applying pressure and heat, the positional accuracy between the optical waveguide 30X and each of the first silicon photonic chip 10X and the second silicon photonic chip 20X is on the order of microns (for example, about ±2 to 3 μm).

However, the alignment of the first silicon photonic chip 10X and the second silicon photonic chip 20X with the optical waveguide 30X requires sub-micron positional accuracy (for example, about ±0.5 μm). In the structure of the optical module 2X in which flip-chip mounting needs to be performed while ensuring optical alignment with the optical waveguide 30X, it is extremely difficult to achieve sub-micron positional accuracy (for example, about ±0.5 μm).

In the optical module 2, the optical connection structure 1 in which the first silicon photonic chip 10, the second silicon photonic chip 20, and the optical waveguide 30 are integrated is flip-chip mounted on the interconnect substrate 3. The positional accuracy required for the first silicon photonic chip 10, the second silicon photonic chip 20, and the optical waveguide 30 is already achieved in the optical connection structure 1. Accordingly, even if the positional accuracy of flip-chip mounting the optical connection structure 1 on the interconnect substrate 3 is on the order of microns (for example, about ±2 to 3 μm), this positional accuracy does not affect optical communication.

As described above, the optical module 2 can achieve the sub-micron positional accuracy required for the first silicon photonic chip 10, the second silicon photonic chip 20, and the optical waveguide 30 even when the optical connection structure 1 is flip-chip mounted on the interconnect substrate 3 with routine positional accuracy. That is, the positional accuracy between the optical waveguide 30 and the first and second silicon photonic chips 10 and 20 can be improved, compared with the optical module 2X of the comparative example.

First Variation of First Embodiment

A first variation of the first embodiment is directed to an example of an optical connection structure having a support substrate. In the first variation of the first embodiment, a description of the same components as those of the previously described embodiment may be omitted.

FIG. 8 is a cross-sectional view illustrating an optical connection structure according to the first variation of the first embodiment. As illustrated in FIG. 8, an optical connection structure 1A is different from the optical connection structure 1 in that a support substrate 100 is provided.

In the optical connection structure 1A, the lower surface of the first silicon substrate 11 is attached to the upper surface of the support substrate 100 via the first adhesive layer 120. The lower surface of the second silicon substrate 21 is attached to the upper surface of the support substrate 100 via the second adhesive layer 130. The support substrate 100 is mechanically connected to, but not electrically connected to, the first silicon photonic chip 10 and the second silicon photonic chip 20. In order to manufacture the optical connection structure 1A, singulation may be performed without removing the support substrate 100 in the process step illustrated in FIGS. 5A and 5B.

As described above, the optical connection structure 1A is provided with the support substrate 100, and can thus have higher rigidity than the optical connection structure 1. In contrast, the optical connection structure 1 is not provided with the support substrate 100, and thus has a higher degree of freedom in design because any member such as a heatsink can be disposed at the position where the support substrate 100 was provided. The support substrate 100 of the optical connection structure 1A illustrated in FIG. 8 may be made of a metal material, which leads to an improvement in heat dissipation.

In the optical module 2, the optical connection structure 1A may be used in place of the optical connection structure 1.

According to at least one embodiment, positional accuracy between a silicon photonic chip and an optical waveguide is improved in an optical connection structure including the silicon photonic chip and the optical waveguide.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical connection structure comprising:
a first silicon photonic chip having a first lateral surface;
a second silicon photonic chip having a second lateral surface and disposed such that the second lateral surface faces the first lateral surface;
an optical waveguide disposed astride a gap between the first silicon photonic chip and the second silicon photonic chip; and
a support substrate,
wherein the first silicon photonic chip includes:
a first silicon substrate; and
a first silicon waveguide disposed over an upper surface of the first silicon substrate, the second silicon photonic chip includes:
a second silicon substrate; and
a second silicon waveguide disposed over an upper surface of the second silicon substrate, and
the optical waveguide includes:
a first cladding filling a space between the first lateral surface and the second lateral surface;
a core disposed on the first cladding and covering one end of the first silicon waveguide and one end of the second silicon waveguide, the core optically connecting the first silicon waveguide and the second silicon waveguide; and
a second cladding covering the core,
wherein a lower surface of the first silicon substrate is attached to an upper surface of the support substrate via a first adhesive layer, and a lower surface of the second silicon substrate is attached to the upper surface of the support substrate via a second adhesive layer, and wherein the support substrate and the first silicon photonic chip are not electrically connected to each other, and the support substrate and the second silicon photonic chip are not electrically connected to each other.

2. The optical connection structure as claimed in claim 1, wherein a width of the one end of the first silicon waveguide narrows toward the first cladding in plan view, and a width of the one end of the second silicon waveguide narrows toward the first cladding in plan view.

3. The optical connection structure as claimed in claim 1, wherein the first silicon waveguide is disposed between a first protective film disposed on the first silicon substrate and a second protective film disposed on the first protective film, and the one end of the first silicon waveguide extends beyond the second protective film, and wherein the second silicon waveguide is disposed between a third protective film disposed on the second silicon substrate and a fourth protective film disposed on the third protective film, and the one end of the second silicon waveguide extends beyond the fourth protective film.

4. The optical connection structure as claimed in claim 3, further comprising electrode pads for external connection disposed on the second protective film and the fourth protective film.

5. The optical connection structure as claimed in claim 3, wherein a surface of the first protective film on which the first silicon waveguide is disposed, a surface of the third protective film on which the second silicon waveguide is disposed, and a surface of the first cladding on which the core is disposed are flush with each other.

6. The optical connection structure as claimed in claim 1, wherein the first silicon photonic chip includes a light emitting device configured to emit light that is coupled into another end of the first silicon waveguide, and the second silicon photonic chip includes a light receiving device configured to receive light emitted from another end of the second silicon waveguide.

7. The optical connection structure as claimed in claim 1, wherein a plurality of said first silicon waveguides are disposed over the upper surface of the first silicon substrate, and a plurality of said second silicon waveguides are disposed over the upper surface of the second silicon substrate, and wherein the optical waveguide includes a plurality of said cores each of which covers one end of a corresponding one of the first silicon waveguides and one end of a corresponding one of the second silicon waveguides and each of which optically connects a corresponding one of the first silicon waveguides and a corresponding one of the second silicon waveguides.

8. An optical module comprising:

the optical connection structure of claim 1; and an interconnect substrate, wherein the first silicon photonic chip and the second silicon photonic chip are flip-chip mounted on the interconnect substrate.

* * * * *